(12) United States Patent
Govari

(10) Patent No.: US 11,295,468 B2
(45) Date of Patent: Apr. 5, 2022

(54) DETERMINING AN ENCLOSING WALL SURFACE OF A CAVITY OF AN ORGAN

(71) Applicant: BIOSENSE WEBSTER (ISRAEL) LTD., Yokneam (IL)

(72) Inventor: Assaf Govari, Haifa (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 277 days.

(21) Appl. No.: 16/826,395

(22) Filed: Mar. 23, 2020

(65) Prior Publication Data

US 2021/0295549 A1  Sep. 23, 2021

(51) Int. Cl.
G06K 9/00 (2022.01)
G06T 7/62 (2017.01)
G06T 17/10 (2006.01)

(52) U.S. Cl.
CPC .......... *G06T 7/62* (2017.01); *G06T 17/10* (2013.01); *G06T 2207/10028* (2013.01)

(58) Field of Classification Search
None
See application file for complete search history.

(56) References Cited

U.S. PATENT DOCUMENTS

| 7,084,867 | B1 | 8/2006 | Ho |
| 7,586,489 | B2 | 9/2009 | Müller-Fischer |
| 2006/0253029 | A1* | 11/2006 | Altmann ............... A61B 5/062 600/466 |
| 2018/0200018 | A1* | 7/2018 | Silva ..................... A61B 34/20 |
| 2019/0197765 | A1 | 6/2019 | Molyneaux |
| 2020/0302689 | A1* | 9/2020 | Li ........................... G06T 17/20 |
| 2021/0174940 | A1* | 6/2021 | Rodriguez ............ G06T 17/20 |

FOREIGN PATENT DOCUMENTS

| EP | 1070480 A2 | 1/2001 |
| EP | 2338419 A1 | 6/2011 |

OTHER PUBLICATIONS

Ma, Lingni, et al. "Plane segmentation and decimation of point clouds for 3D environment reconstruction." 2013 IEEE 10th Consumer Communications and Networking Conference (CCNC). IEEE, 2013. (Year: 2013).*
European Search Report for corresponding EPA No. 21163925.7 dated Sep. 14, 2021.

* cited by examiner

*Primary Examiner* — Sean M Conner

(57) ABSTRACT

A method for determining an enclosing surface of a cavity of an organ of a patient includes receiving a plurality of data points including respective position measurements in the cavity. A first iterative process is performed, that progressively divides sub-volumes into smaller sub-volumes, until a density of the data points in each sub-volume falls below a predefined density. A second iterative process is performed, that progressively discards sub-volumes that are fully-surrounded by populated sub-volumes, and discards the data points contained in the discarded sub-volumes. The enclosing surface of the cavity is defined based on the data points remaining after the second iterative process. The enclosing surface of the cavity is presented to a user.

16 Claims, 4 Drawing Sheets

DETERMINING AN ENCLOSING WALL SURFACE OF A CAVITY OF AN ORGAN

FIELD OF THE INVENTION

The present invention relates generally to electroanatomical mapping, and particularly to the analysis of electroanatomical data.

BACKGROUND OF THE INVENTION

Various techniques were proposed to generate cardiac an electroanatomical map from intra-cardiac electroanatomical measurements. For example, U.S. Pat. No. 7,586,489 describes a method of generating a three-dimensional (3D) surface defined by a boundary of a 3D point cloud. The method comprises generating density and depth maps from the 3D point cloud, constructing a 2D mesh from the depth and density maps, transforming the 2D mesh into a 3D mesh, and rendering 3D polygons defined by the 3D mesh. One way to reduce the number of polygons rendered without compromising details is to simplify the 2D mesh. One way to simplify the 2D mesh is to use a quad-tree hierarchy to combine similar adjacent cells. In general, this allows the combined cells in the hierarchy to be represented by a small number of mesh patterns. For example, by ensuring that no two adjacent cells differ by more than one (1) level in the quad-tree hierarchy.

As another example, U.S. Patent Application Publication 2019/0197765 describes an augmented reality/mixed reality system for viewing an imaged anatomy, which provides a more immersive user experience. That experience is provided with increased speed of update for occlusion data by using depth sensor data augmented with lower-level reconstruction data. When operating in real-time dynamic environments, changes in the physical world can be reflected quickly in the occlusion data. Occlusion rendering using live depth data augmented with lower-level 3D reconstruction data, such as a ray cast point cloud, can greatly reduce the latency for visual occlusion processing. Generating occlusion data in this way may provide faster operation of an x-ray system using fewer computing resources. In generating and storing information for the point cloud representation, information is also retained in memory which allows a determination as to the triangle in a triangulated surface model which each point of the point cloud is located in. The information is also stored for the creation of a bounding volume (BV) hierarchy.

SUMMARY OF THE INVENTION

An embodiment of the present invention provides a method for determining an enclosing surface of a cavity of an organ of a patient, the method including receiving a plurality of data points including respective position measurements in the cavity. A first iterative process is performed, that progressively divides sub-volumes into smaller sub-volumes, until a density of the data points in each sub-volume falls below a predefined density. A second iterative process is performed, that progressively discards sub-volumes that are fully-surrounded by populated sub-volumes, and discards the data points contained in the discarded sub-volumes. The enclosing surface of the cavity is defined based on the data points remaining after the second iterative process. The enclosing surface of the cavity is presented to a user.

In some embodiments, performing the first iterative process includes constructing tree-graphs having multiple levels, in which vertices represent the sub-volumes, and children of a vertex represent the sub-volumes into which a volume represented by the vertex was divided.

In some embodiments, performing the second iterative process includes scanning the vertices of the tree-graph starting from a selected level, and, upon finding that a sub-volume corresponding to a scanned vertex is surrounded by populated sub-volumes, discarding the scanned vertex and the children of the scanned vertex from the tree-graph.

In some embodiments, the selected level is determined according to a required resolution of the enclosing surface.

In an embodiment, defining the enclosing surface includes interpolating or connecting the remaining data points.

In another embodiment, presenting the enclosing surface includes overlaying electrophysiological measurements over the enclosing surface.

In some embodiments, the sub-volumes include cubes. In other embodiments, the sub-volumes include tetrahedrons.

There is additionally provided, in accordance with an embodiment of the present invention, a system configured to determine an enclosing surface of a cavity of an organ of a patient, the system including an interface and a processor. The interface is configured to receive a plurality of data points including respective position measurements in the cavity. The processor is configured to (a) perform a first iterative process that progressively divides sub-volumes into smaller sub-volumes, until a density of the data points in each sub-volume falls below a predefined density, (b) perform a second iterative process that progressively discards sub-volumes that are fully-surrounded by populated sub-volumes, and discards the data points contained in the discarded sub-volumes, (c) define the enclosing surface of the cavity based on the data points remaining after the second iterative process, and (d) present the enclosing surface of the cavity to a user.

BRIEF DESCRIPTION OF THE DRAWINGS

The present invention will be more fully understood from the following detailed description of the embodiments thereof, taken together with the drawings in which.

DETAILED DESCRIPTION OF EMBODIMENTS

Overview

Figure 1:
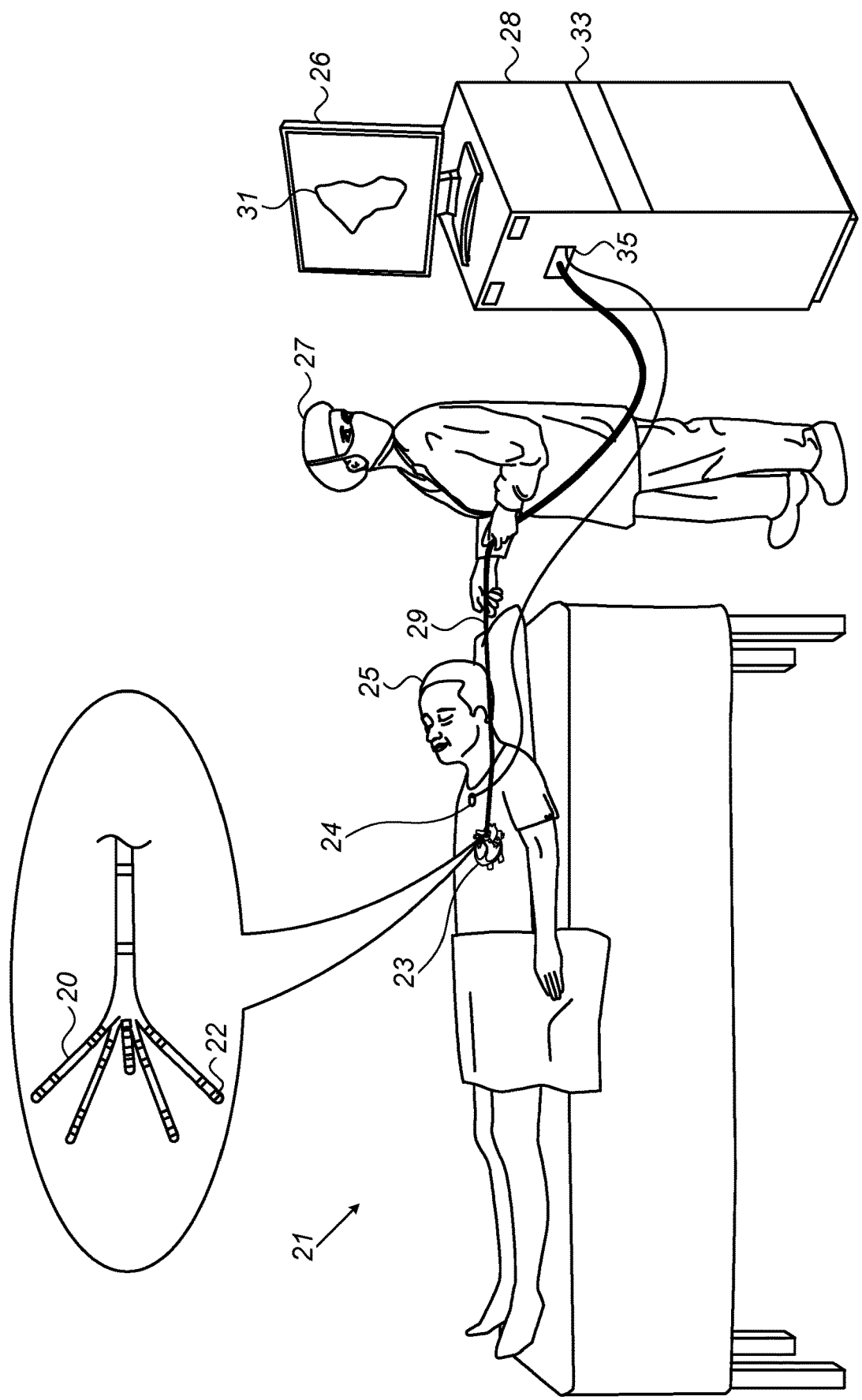
FIG. 1 is a schematic, pictorial illustration of a system for electroanatomical (EA) mapping, in accordance with an exemplary embodiment of the present invention.

When imaging a cavity in an organ of a patient, e.g., a cardiac cavity, it may be desirable to model an enclosing surface of the cavity, i.e., the cavity wall. When performing cardiac imaging, for example, electrophysiological values can then be estimated and overlaid over the wall of the cardiac chamber. The enclosing surface can be estimated using point cloud data acquired by a probe such as a mapping catheter during an electroanatomical (EA) mapping procedure. A processor may estimate the enclosing surface using data points spread both in blood volume and on wall surface, but such calculation takes a relatively large amount of time to complete.

For example, previously proposed methods to find an enclosing shell for a point cloud, such as the IBM ball-pivot method, may be adapted to produce a surface of a chamber of the heart (e.g., of a left atrium). However, complexity of such methods typically scales linearly with the number of data points in the cloud, making these time and computation resource consuming.

Exemplary embodiments of the present invention that are described hereinafter provide a method to determine an enclosing surface of a cavity from point cloud data that scales approximately logarithmically. The efficiency of the disclosed method depends on the ability of the method to readily identify, and discard, irrelevant volumetric data (e.g., data points not adjacent to the surface). In more detail, in a best-case scenario, the complexity of the disclosed method would scale $O(\log(n))$, and in a worst-case scenario the complexity would scale $O(n \cdot \log(n))$. In typical cases, especially when there is a sufficiently large number, n, of data points, the complexity of the disclosed method tends to be logarithmic. Therefore, the disclosed method is best suited to find an enclosing surface of a cavity based on dense EA mapping, although it is also suited for use with sparse EA mapping methods.

In the disclosed embodiments, a processor receives "point cloud data"—a large number of data points. The data points comprise position measurements acquired, for example, by a mapping catheter that is moved across a cardiac chamber. Considering first, for simplicity, analysis of a point cloud in 2D, the processor initially constructs a bounding curve, typically a bounding square, around the point cloud. The processor then divides this square area into sub-areas, e.g., into four sub-squares (e.g., using a Quadtree tree data structure), and each of the four-square areas is further divided. The process of division is continued until the density of points in each sub-square falls below a predefined density, e.g., until there are fewer than a prespecified number of points in each square area, at which stage the division is stopped.

The divisions are tracked by level, with the processor forming a tree-graph in which different branches of the graph have different lowest levels (e.g., smallest sub-squares per given branch of the tree-graph), as described below. Each vertex in the tree-graph corresponds to a square defined by the processor. The root of the tree-graph represents the initial bounding square. The direct children of a vertex correspond to the sub-squares of the square represented by the vertex. The leaves of the tree-graph represent the smallest sub-squares at which division was stopped.

The 2D example above is given mainly for ease of explanation. In real-life implementations the point cloud data typically comprises 3D position measurements, and the processor defines 3D cubes that are sub-divided into sub-cubes.

In the context of the present disclosure, a lower level is defined as a level closer to the leaves, i.e., a next level received after further division. Thus, the next lower level in the tree-graph marks the next smaller sub-area in case of 2D, or smaller sub-volume in case of 3D.

Having constructed the tree-graph, the processor proceeds to estimate the enclosing surface of the point cloud data using the tree-graph. The determination of the enclosing perimeter of the point cloud using the tree-graph begins by selecting a suitable low level of the tree-graph (but not too low a level). A relation between the suitable low level and a given EA mapping is determined, for example, by setting a threshold for the required resolution (e.g., allowing division down to one millimeter sized sub-cubes, which is clinically a sufficient resolution of an EA map. The processor analyzes each sub-square belonging to the selected level, to check if it is entirely surrounded by populated sub-squares belonging to the selected level (i.e., by sub-squares containing at least the prespecified number of points used as a stopping criterion when building the tree-graph).

While the stopping criteria used above (i.e., for the division and for checking for surrounding populated sub-squares) are the same, in other exemplary embodiments, one criterion (e.g., a first prespecified number) is applied for stopping the sub-partitioning of volumes when constructing the tree, and a different criterion (e.g., a second prespecified number) for deciding whether a volume is surrounded by populated volumes.

If the square is fully surrounded by four populated sub-squares, the processor concludes that the sub-square is an "internal" square in the cloud. In such a case, all lower-level squares contained in the checked sub-square are internal to the cloud, as well. Thus, all the data points in the checked square can be removed from the point cloud, and all lower-level squares within the checked square can be removed from the analysis. To this end, the processor erases from the tree-graph (i) the vertex representing the analyzed sub-square and (ii) the entire branch under the selected vertex (i.e., erases all direct and indirect children of the vertex in question).

However, if a sub-square is not fully surrounded with populated squares, meaning that at least one surrounding sub-square has fewer than the prespecified number of points inside, the processor assumes that the data points in the sub-square are part of the "external" bounding perimeter of the point cloud.

The analysis continues, by analyzing sub-squares belonging to a next-lower level of the remaining tree-graph branches, until no fully-surrounded sub-squares are left at any level, so that the remaining (not fully surrounded) squares include only data points belonging to the bounding perimeter of the cloud.

For a point cloud in 3D, the initial analysis begins by the processor constructing a bounding surface, typically a bounding cube, around the 3D point cloud. This cube is then divided into sub-volumes, e.g., eight sub-cubes (e.g., using an Octree tree data structure), and the division continues until the density of points in each sub-volume falls below a predefined density, e.g., until there are fewer than a pre-specified number of points in each sub-volume (e.g., sub-cube), at which stage the division is stopped. Internal sub-cubes are found by checking whether a cube is surrounded by six populated sub-cubes (i.e., sub-cubes which at the given level checked still include at least the prespecified number of points used as a stopping criterion when building the tree-graph).

If a sub-cube meets the above condition, the processor assumes it is an internal sub-cube. The processor then erases from the tree-graph the analyzed sub-cube and the entire branch under the selected sub-cubes (i.e., erases all lower-level vertices from the tree-graph). If a sub-cube does not meet this condition, then the processor concludes it includes data points belonging to the bounding surface of the point cloud.

The analysis continues, by analyzing sub-cubes belonging to a next lower level of the remaining tree-graph, until only not-fully-surrounded sub-cubes are left at all levels, meaning that the remaining sub-cubes include data points (e.g., positions and respective electro-potential values) of the bounding surface of the point cloud.

After the tree-graph is fully analyzed, the processor may post-process the remaining data points to present a smooth surface in 3D space, for example, by interpolating between neighboring remaining data points. The processor may then display the estimated outer surface of the cavity to a user (e.g., a physician) with corresponding electrophysiological measurements overlaid on it.

The size of the smallest sub-cubes per branch of the tree-graph has to be small enough, e.g., minimally sized between a few to several millimeters, to produce a useful map. As a typical heart chamber, such as a left atrium, is readily enclosed within a seven-centimeter sized cube, it is sufficient to run the disclosed algorithm to level five (5) so as to divide space into, for example, approximately minimally sized two-millimeter sized sub-cubes at the lowest-levels of the respective tree-graph. Moreover, in an exemplary embodiment, the bounding shape may be other than a cube, e.g., such as a box of uneven XYZ dimensions, depending on the general shape of the cavity under analysis. For example, for an elongated cavity, such as a left ventricle, an 8×8×10 cm bounding box will be divided into approximately 2×2×4 mm minimally sized sub-boxes when running the disclosed algorithm to a level five (5).

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±20% of the recited value, e.g. "about 90%" may refer to the range of values from 71% to 99%.

In some exemplary embodiments, the processor can check whether a cube is surrounded by a different number of neighboring populated sub-cubes than the ones at the six facets (e.g., include diagonal neighboring sub-cubes too, or consider only part of all the six facets).

In other exemplary embodiments, the processor may divide a volume bounded by a bounding surface into sub-volumes of any shape (e.g., polygons) and repeatedly divide the sub-volumes until there are fewer than the prespecified number of points in each sub-volume. For example, the processor may repeatedly divide the bounded volume into sub-volumes comprising tetrahedrons. The processor then checks each sub-volume to determine if it is fully surrounded by populated sub-volumes (e.g., populated tetrahedrons), in a similar manner as described above with cubes, with number of neighboring polygons adapted to the number of facets (four in case of a tetrahedrons).

Typically, the processor is programmed in software containing a particular algorithm that enables the processor to conduct each of the processor-related steps and functions outlined above.

It will be understood that the method only applies to "well-behaved" bounding shells, i.e., shells, such as the surface of a heart chamber, that are (approximately) topologically equivalent to an ellipsoid. The method does not apply to topologically "complicated" shells that include, for example, internal spaces.

By using the disclosed surface-finding method with a sufficiently large point cloud data set, a processor can derive a surface map with minimal computational effort and therefore with a small amount of available computing resources, which may enable low cost EA mapping solutions.

System Description

FIG. 1 is a schematic, pictorial illustration of a system 21 for electroanatomical (EA) mapping, in accordance with an exemplary embodiment of the present invention. FIG. 1 depicts a physician 27 using an EA Pentaray® mapping catheter 29 to perform an EA mapping of a heart 23 of a patient 25. Catheter 29 comprises, at its distal end, one or more arms 20, which may be mechanically flexible, each of which is coupled with one or more electrodes 22. During the mapping procedure, the catheter is moved inside a cavity of heart 23, and electrodes 22 acquire and/or inject unipolar and/or bipolar signals from and/or to the blood and wall tissue of the cavity. A processor 28 receives these signals via an electrical interface 35, and uses information contained in these signals to construct point cloud data and consequently an EA map 31 of the cavity that processor 28 stores in a memory 33. During and/or following the procedure, processor 28 may display EA map 31 on a display 26.

As noted above, a majority of the point cloud data collected by EA mapping system 21 is irrelevant blood data. In embodiments of the present invention, processor 28 constructs EA map 31 by identifying and dropping blood data and determining an enclosing cardiac surface from only a fraction of the acquired cloud of electroanatomical data points, which results in reduced computation complexity that scales approximately logarithmically.

During the procedure, a tracking system is used to track the respective locations of sensing electrodes 22, such that each of the signals may be associated with the location at which the signal was acquired. For example, the Advanced Catheter Location (ACL) system, made by Biosense-Webster (Irvine, Calif.), which is described in U.S. Pat. No. 8,456,182, whose disclosure is incorporated herein by reference, may be used. In the ACL system, a processor estimates the respective locations of the electrodes based on impedances measured between each of the sensing electrodes 22, and a plurality of surface electrodes 24, that are coupled to the skin of patient 25. For example, three surface electrodes 24 may be coupled to the patient's chest, and another three surface electrodes may be coupled to the patient's back. (For ease of illustration, only one surface electrode is shown in FIG. 1.)

Electric currents are passed between electrodes 22 inside the heart 23 of the patient 25 and surface electrodes 24. Processor 28 calculates an estimated location of all electrodes 22 within the patient's heart 23 based on the ratios between the resulting current amplitudes measured at surface electrodes 24 (or between the impedances implied by these amplitudes) and the known positions of electrodes 24 on the patient's body. The processor 28 may thus associate any given impedance signal received from electrodes 22 with the location at which the signal was acquired to generate the cloud of electroanatomical data points.

The example illustration shown in FIG. 1 is chosen purely for the sake of conceptual clarity. Other tracking methods may be used, such as those based on measuring voltage signals. Other types of sensing catheters, such as the Lasso® Catheter (produced by Biosense Webster) may equivalently be employed. Contact sensors may be fitted at the distal end of EA catheter 29. As noted above, other types of electrodes, such as those used for ablation, may be utilized in a similar way, fitted to electrodes 22 for acquiring the needed position data. Thus, an ablation electrode used for collecting position data is regarded, in this case, as a sensing electrode. In an optional exemplary embodiment, processor 28 is further configured to indicate the quality of physical contact between each of the electrodes 22 and an inner surface of the cardiac chamber during measurement.

Processor 28 typically comprises a general-purpose computer with software programmed to carry out the functions described herein. In particular, processor 28 runs a dedicated algorithm as disclosed herein, including in reference to FIG. 3, that enables processor 28 to perform the disclosed steps, as further described below. The software may be downloaded to the computer in electronic form, over a network, for example, or it may, alternatively or additionally, be provided and/or stored on non-transitory tangible media, such as magnetic, optical, or electronic memory.

Finding Enclosing Surface of a Cavity Represented by a Point Cloud

Figure 2:
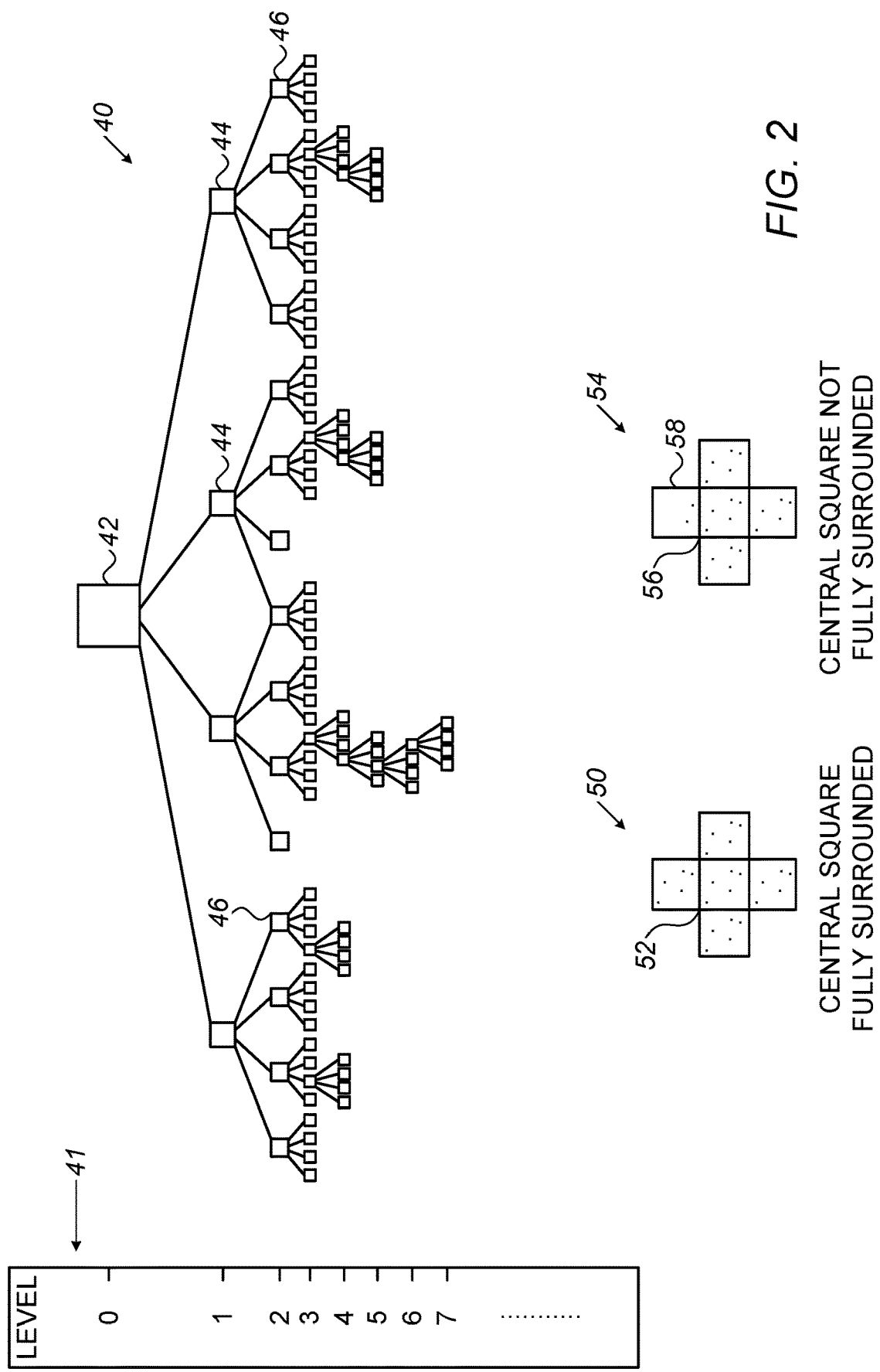
FIG. 2 is a schematic tree-graph used for determining an enclosing surface from point cloud data acquired by the system of FIG. 1, in accordance with an exemplary embodiment of the present invention.

FIG. 2 is a schematic tree-graph 40 used for determining an enclosing surface from point cloud data acquired by system 21 of FIG. 1, in accordance with an exemplary embodiment of the present invention. Such typical point cloud data of an EA map includes positions and respective electro-potential values but may include other types of data such as contact force of the catheter at the position. Considering a 2D point cloud for simplicity of presentation, processor 28 initially constructs a bounding square 42 around the point cloud. This square is divided into four sub-squares 44, and each of the four sub-squares is further divided into sub-squares 46, which typically results in different branches of tree-graph 40 comprising different sizes of minimal sub-squares.

The divisions are tracked by respective level 0, 1, 2 . . . , seen in a legend 41 of the line level per each division. As seen, at one branch the division ends at level 2, while at others at levels 3, 4, 5 or 7 of tree-graph 40. The process of division continues until there are fewer than the prespecified number of points in each square, after which the division is stopped.

The determination of the enclosing perimeter using tree-graph 40 begins by analyzing a suitable low level of the tree-graph, determined as described above. As seen, each sub-square is analyzed (50, 54) to check if it is fully surrounded. If the square is fully surrounded by four populated squares, such as is sub-square 52, the square must be an "internal" square to the cloud. Also, all lower-level (i.e., smaller area) sub-squares contained in the checked square are internal. Thus, all the points of checked sub-square 52 can be removed from the point cloud, and all lower-level squares within sub-square 52 (such lower-level squares are shown in tree-graph 40) can be removed from the analysis.

However, if a sub-square is not fully surrounded, meaning that at least one surrounding square has fewer than the prespecified number of points inside, such as sub-square 56, which has a surrounding sub-square 58 largely empty of data points, processor 28 assumes that data points inside the not fully surrounded square are part of the "external" bounding perimeter of the point cloud. The analysis continues until all fully surrounded sub-squares, such as sub-square 52, have been excluded, so that only data point belonging to the remaining not fully surrounded squares form the bounding perimeter (e.g., bounding surface) of the cloud.

Figure 3:
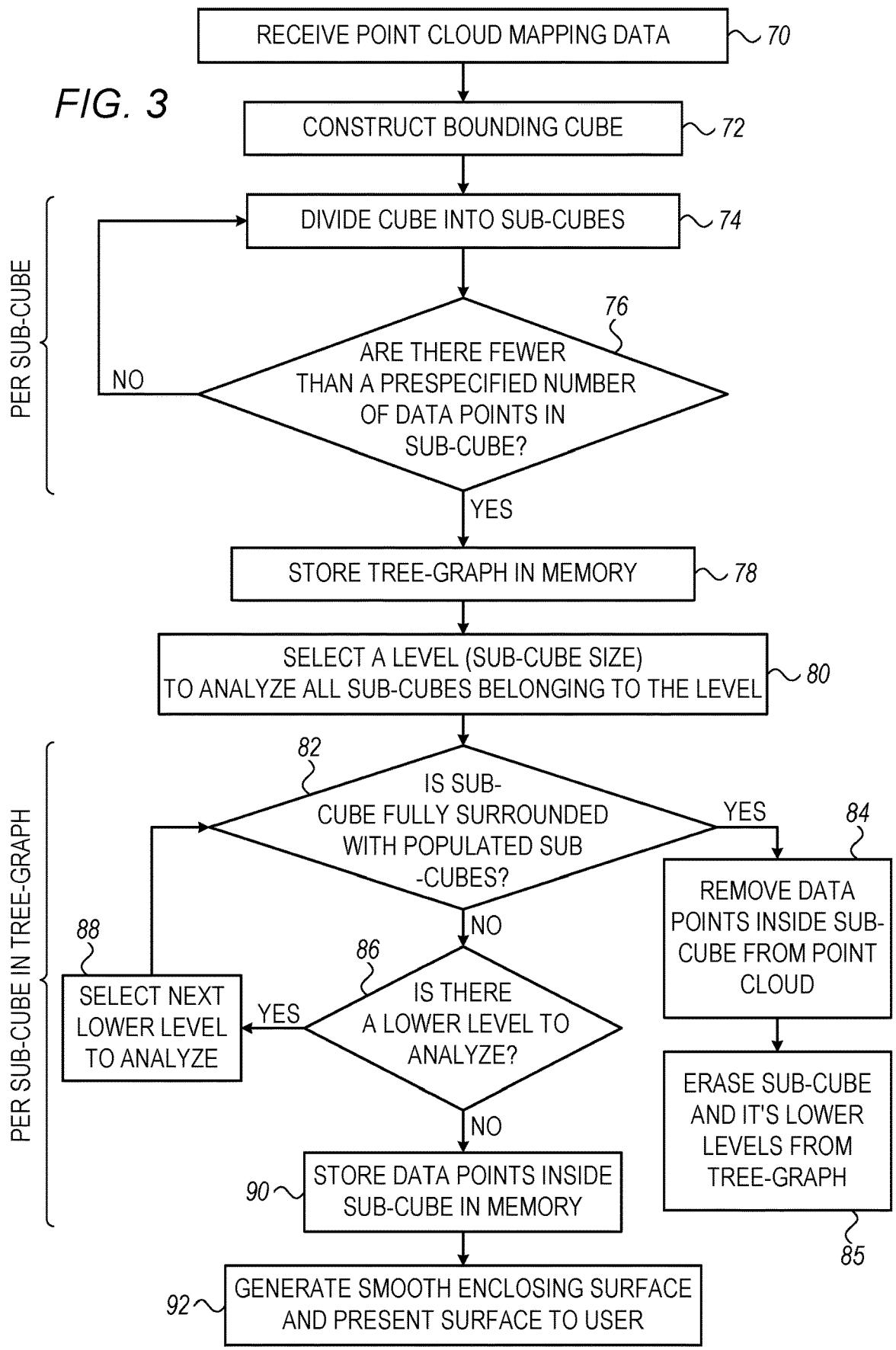
FIG. 3 is a flow chart that schematically illustrates a method to determine an enclosing cardiac surface from a cloud of electroanatomical data points using the tree-graph of FIG. 2, in accordance with an exemplary embodiment of the present invention.

FIG. 3 is a flow chart that schematically illustrates a method to determine an enclosing cardiac surface from a cloud of electroanatomical data points using tree-graph 40 of FIG. 2, in accordance with an exemplary embodiment of the present invention. The algorithm, according to the present embodiment, carries out a process that begins with processor 28 receiving point cloud mapping data, such as acquired by catheter 29 during an EA mapping session shown in FIG. 1, at a data receiving step 70. The point cloud mapping data comprises a plurality of data points, each data point comprising a 3D position measurement. Some or all of the data points may also comprise a corresponding EP measurement.

Next, processor 28 constructs a bounding surface, such as a bounding cube (as illustrated in 2D in FIG. 2 by square 42), that encloses a volume including the data points, at bounding surface construction step 72.

Next, the processor divides the enclosed volume by the bounding surface into sub-cubes, at a cube division step 74. At a checking step 76, the processor checks if there are fewer than the prespecified number of data points left in each sub-cube. If in some sub-cubes it is still not so, the processor returns to step 74 to further divide these sub-cubes. The process is repeated until sub-cubes (which may be of different sizes) are formed, each of which containing fewer than the prespecified number of data points. Steps 74 and 76 form a graph-tree, such as graph-tree 40 of FIG. 2, which processor 28 stores in memory 33 at a storing step 78.

Next, processor 28 selects a level of tree-graph 40 to analyze all sub-cubes belonging to that level, at a level selection step 80. Processor 28 then checks each sub-cube belonging to the selected level to determine if it is completely surrounded by populated sub-cubes belonging to the selected level, i.e., by sub-cubes each having fewer than the prespecified number of data points inside each sub-cube, at sub-cube checking step 82. If the answer is yes, meaning that the checked sub-cube is entirely internal to the searched enclosing surface, the processor removes the data points in the sub-cube, at a data dropping step 84. Furthermore, processor 28 erases from tree-graph 40 the analyzed sub-cube and the entire branch under the selected sub-cube (i.e., erases all lower levels), at a tree-graph updating step 85.

If, on the other hand, a sub-cube is not fully surrounded, processor 28 checks if there is a lower level to analyze sub-cubes smaller than the selected sub-cube, at a checking lower level step 86. If the answer is yes, processor 28 selects to analyze all sub-cubes under the initially analyzed sub-cube at a lower level selection step 88. The process then returns to step 82 to complete analysis.

After sub-cubes are analyzed and only lowest level sub-cubes not fully surrounded left, process 28 records (e.g., stores in memory 33) the data points included in each such sub-cube, at a sub-cube recording step 90.

Finally, the processor uses all the stored data points to generate (e.g., construct) a continuous model of an enclosing anatomic cardiac surface, and presents the constructed enclosing surface to a user, at enclosed surface modeling step 92.

The example flow chart shown in FIG. 3 is chosen purely for the sake of conceptual clarity. In optional exemplary embodiments, various additional steps may be performed, such as, for example, interpolations.

Figure 4:
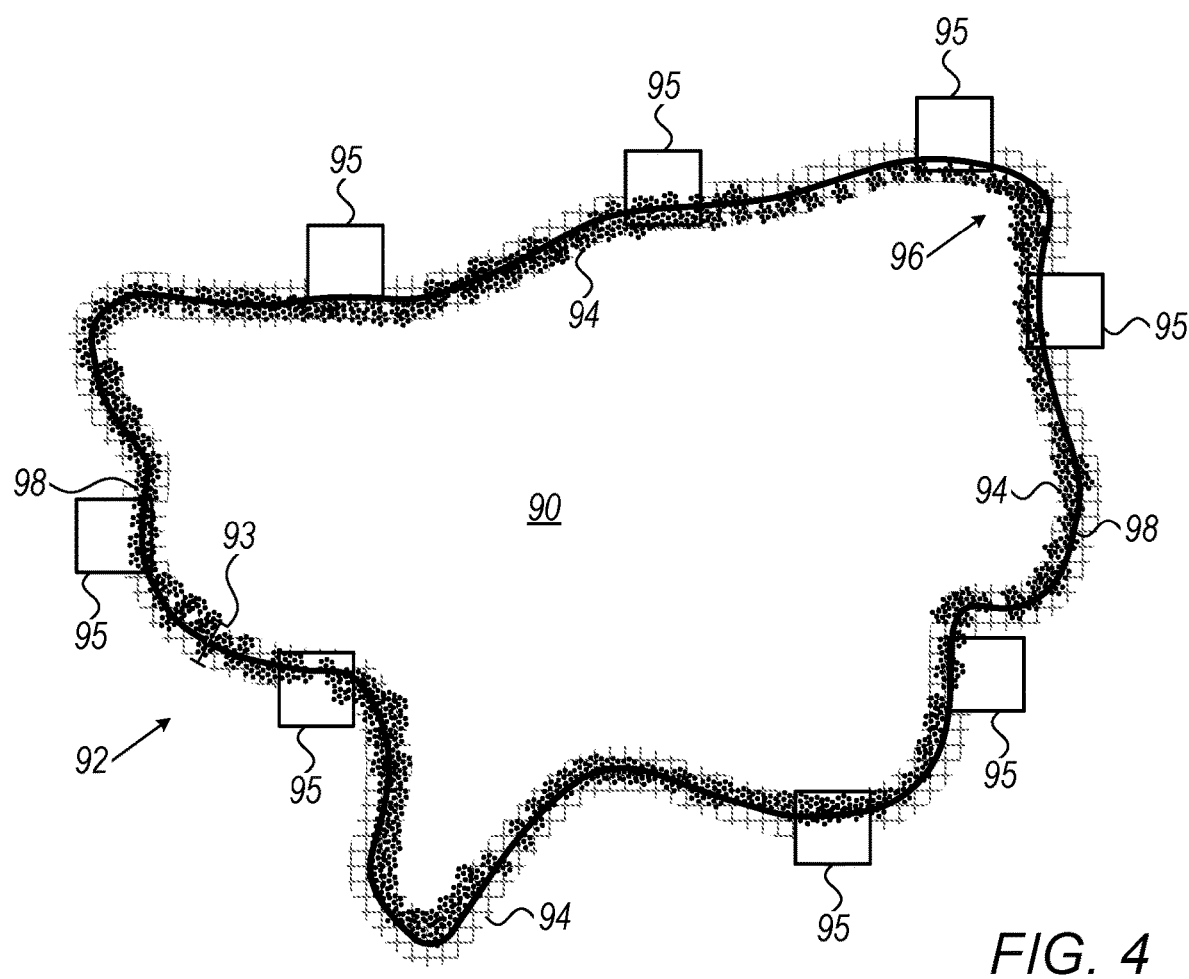
FIG. 4 is a schematic, pictorial volume rendering of an anatomical map comprising a surface enclosing a left atrium, generated by the method described in FIG. 3, in accordance with an exemplary embodiment of the present invention.

FIG. 4 is a schematic, pictorial volume rendering of an anatomical map 90 comprising a surface 92 enclosing a left atrium, generated by the method described in FIG. 3, in accordance with an embodiment of the present invention. As seen, enclosing surface 92, which has a width 93, is constructed by data points included in a mathematical union of sub-cubes 94 and 95 (for simplicity illustrated as squares). Sub-cubes 94 and 95 are the lower level external sub-cubes from different branches of tree-graph 40, and thus include data points 96 of the point cloud, which remained after data point of internal cubes were dropped in the process described in FIGS. 2 and 3.

While the shown enclosing surface 92 describes the left atrium as required, the shape of the enclosing surface may be improved by the processor forming curve 98 (in practice a surface), for example, by using weighted or moment-method based interpolation to link neighboring data points 96. Alternatively, a best fit least square method may be used to generate curve 98 from data points 96.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for determining an enclosing surface of a cavity of an organ of a patient, the method comprising:
receiving a plurality of data points comprising respective position measurements in the cavity;
performing a first iterative process that progressively divides sub-volumes into smaller sub-volumes, until a density of the data points in each sub-volume falls below a predefined density;
performing a second iterative process that progressively discards sub-volumes that are fully-surrounded by populated sub-volumes, and discards the data points contained in the discarded sub-volumes;
defining the enclosing surface of the cavity based on the data points remaining after the second iterative process; and
presenting the enclosing surface of the cavity to a user.

2. The method according to claim 1, wherein performing the first iterative process comprises constructing tree-graph having multiple levels, in which vertices represent the sub-volumes, and children of a vertex represent the sub-volumes into which a volume represented by the vertex was divided.

3. The method according to claim 2, wherein performing the second iterative process comprises scanning the vertices of the tree-graph starting from a selected level, and, upon finding that a sub-volume corresponding to a scanned vertex is surrounded by populated sub-volumes, discarding the scanned vertex and the children of the scanned vertex from the tree-graph.

4. The method according to claim 3, wherein the selected level is determined according to a required resolution of the enclosing surface.

5. The method according to claim 1, wherein defining the enclosing surface comprises interpolating or connecting the remaining data points.

6. The method according to claim 1, wherein presenting the enclosing surface comprises overlaying electrophysiological measurements over the enclosing surface.

7. The method according to claim 1, wherein the sub-volumes comprise cubes.

8. The method according to claim 1, wherein the wherein the sub-volumes comprise tetrahedrons.

9. A system configured to determine an enclosing surface of a cavity of an organ of a patient, the system comprising:
an interface configured to receive a plurality of data points comprising respective position measurements in the cavity; and
a processor, which is configured to:
perform a first iterative process that progressively divides sub-volumes into smaller sub-volumes, until a density of the data points in each sub-volume falls below a predefined density;
perform a second iterative process that progressively discards sub-volumes that are fully-surrounded by populated sub-volumes, and discards the data points contained in the discarded sub-volumes;
define the enclosing surface of the cavity based on the data points remaining after the second iterative process; and
present the enclosing surface of the cavity to a user.

10. The system according to claim 9, wherein the processor is configured to perform the first iterative process by constructing tree-graph having multiple levels, in which vertices represent the sub-volumes, and children of a vertex represent the sub-volumes into which a volume represented by the vertex was divided.

11. The system according to claim 10, wherein the processor is configured to perform the second iterative process by scanning the vertices of the tree-graph starting from a selected level, and, upon finding that a sub-volume corresponding to a scanned vertex is surrounded by populated sub-volumes, discarding the scanned vertex and the children of the scanned vertex from the tree-graph.

12. The system according to claim 11, wherein the processor is configured to select the level according to a required resolution of the enclosing surface.

13. The system according to claim 9, wherein the processor is configured to define the enclosing surface by interpolating or connecting the remaining data points.

14. The system according to claim 9, wherein the processor is configured to present the enclosing surface by overlaying electrophysiological measurements over the enclosing surface.

15. The system according to claim 9, wherein the sub-volumes comprise cubes.

16. The system according to claim 9, wherein the wherein the sub-volumes comprise tetrahedrons.

* * * * *